United States Patent
Pipard

(10) Patent No.: US 11,795,519 B2
(45) Date of Patent: *Oct. 24, 2023

(54) COLD ROLLED AND HEAT TREATED STEEL SHEET AND A METHOD OF MANUFACTURING THEREOF

(71) Applicant: ArcelorMittal, Luxembourg (LU)

(72) Inventor: Jean-Marc Pipard, Vaux (FR)

(73) Assignee: ArcelorMittal, Luxembourg (LU)

( * ) Notice: Subject to any disclaimer, the term of this patent is extended or adjusted under 35 U.S.C. 154(b) by 146 days.

This patent is subject to a terminal disclaimer.

(21) Appl. No.: 16/761,450

(22) PCT Filed: Nov. 5, 2018

(86) PCT No.: PCT/IB2018/058669
§ 371 (c)(1),
(2) Date: May 4, 2020

(87) PCT Pub. No.: WO2019/123043
PCT Pub. Date: Jun. 27, 2019

(65) Prior Publication Data
US 2020/0407817 A1    Dec. 31, 2020

(30) Foreign Application Priority Data

Dec. 19, 2017    (WO) ................. PCT/IB2017/058125

(51) Int. Cl.
*C21D 9/46* (2006.01)
*C21D 8/02* (2006.01)
*C21D 6/00* (2006.01)
*C22C 38/38* (2006.01)
*C22C 38/28* (2006.01)
*C22C 38/26* (2006.01)
*C22C 38/24* (2006.01)
*C22C 38/06* (2006.01)
*C22C 38/02* (2006.01)
*C22C 38/00* (2006.01)
*B32B 15/01* (2006.01)

(52) U.S. Cl.
CPC .............. *C21D 9/46* (2013.01); *B32B 15/013* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/02* (2013.01); *C22C 38/06* (2013.01); *C22C 38/24* (2013.01); *C22C 38/26* (2013.01); *C22C 38/28* (2013.01); *C22C 38/38* (2013.01); *C21D 2211/001* (2013.01); *C21D 2211/002* (2013.01); *C21D 2211/005* (2013.01); *C21D 2211/008* (2013.01)

(58) Field of Classification Search
CPC ............ B32B 15/013; C21D 2211/001; C21D 2211/002; C21D 2211/005; C21D 2211/008; C21D 6/002; C21D 6/005; C21D 6/008; C21D 8/0205; C21D 8/0226; C21D 8/0236; C21D 8/0263; C21D 8/0273; C21D 9/46; C22C 38/001; C22C 38/002; C22C 38/02; C22C 38/06; C22C 38/24; C22C 38/26; C22C 38/28; C22C 38/34; C22C 38/38; C23C 2/02; C23C 2/06; C23C 2/40
See application file for complete search history.

(56) References Cited

U.S. PATENT DOCUMENTS

| | | |
|---|---|---|
| 9,074,272 B2 | 7/2015 | Akamizu et al. |
| 2006/0269776 A1 | 11/2006 | Tanaka et al. |
| 2006/0292391 A1 | 12/2006 | Ikematsu et al. |
| 2008/0199347 A1 | 8/2008 | Barges et al. |
| 2014/0170439 A1* | 6/2014 | Allain ............ B32B 15/013 148/333 |
| 2014/0242416 A1 | 8/2014 | Matsuda et al. |
| 2015/0101712 A1 | 4/2015 | Futamura et al. |
| 2015/0152533 A1 | 6/2015 | Bongards et al. |
| 2016/0355900 A1 | 12/2016 | Gil Otin |
| 2017/0369966 A1 | 12/2017 | Lee et al. |
| 2019/0003009 A1* | 1/2019 | Kawata ............ C22C 38/04 |

(Continued)

FOREIGN PATENT DOCUMENTS

| | | | |
|---|---|---|---|
| CN | 101263239 A | | 9/2008 |
| JP | 2004190050 A | * | 7/2004 |
| JP | 2007291500 A | | 11/2007 |

(Continued)

OTHER PUBLICATIONS

International Search Report of PCT/IB2018/058669, dated Jan. 8, 2019.

*Primary Examiner* — Jenny R Wu
(74) *Attorney, Agent, or Firm* — Davidson, Davidson & Kappel, LLC

(57) ABSTRACT

A cold rolled and heat treated steel sheet, the steel having a composition with, in weight percentage,
  0.18% ≤ carbon ≤ 0.24%,
  1.5% ≤ manganese ≤ 2.5%,
  1.2% ≤ silicon ≤ 2%,
  0.01% ≤ aluminum ≤ 0.06%,
  0.2% ≤ chromium ≤ 0.5%,
  phosphorus ≤ 0.02%,
  sulfur ≤ 0.03%,
  and optionally one or more of the following elements
  niobium ≤ 0.06%,
  titanium ≤ 0.08%,
  vanadium ≤ 0.1%,
  calcium ≤ 0.005%
  and the balance including iron and unavoidable impurities, the steel sheet having a microstructure having 0% to 15% of tempered martensite, 10% to 15% of residual austenite and optionally up to 30% of ferrite in area fractions, the balance being made of bainite, bainite content being at least 55% and having an internal oxide (Continued)

layer of 3 microns or less on both surfaces of the steel sheet. A manufacturing method and with use of such grade for making vehicle parts is also provided.

24 Claims, 3 Drawing Sheets

(56) References Cited

U.S. PATENT DOCUMENTS

2021/0207234 A1   7/2021   Takashima et al.

FOREIGN PATENT DOCUMENTS

| | | | |
|---|---|---|---|
| JP | 2008024980 A | | 2/2008 |
| JP | 2008069445 A | | 3/2008 |
| JP | 2013032582 A | | 2/2013 |
| JP | 201600831 | | 1/2016 |
| JP | 2017145466 A | * | 8/2017 |
| KR | 101808430 B1 | | 12/2017 |
| RU | 2312162 C2 | | 12/2007 |
| RU | 2312920 C2 | | 12/2007 |
| WO | WO2013051238 A1 | | 4/2013 |
| WO | WO 2016/001702 A1 | | 1/2016 |
| WO | WO2017179372 A1 | | 10/2017 |

* cited by examiner

COLD ROLLED AND HEAT TREATED STEEL SHEET AND A METHOD OF MANUFACTURING THEREOF

The present invention relates to cold rolled and heat treated steel sheet which is suitable for use as a steel sheet for vehicles.

BACKGROUND

Automotive parts are required to satisfy two inconsistent requirements, namely ease of forming and strength, but in recent years a third requirement of improvement in fuel consumption by reducing weight is also required in view of global environment concerns. Thus, now automotive parts must be made of material having high formability, in order to meet the criteria of ease of fit in the intricate automobile assembly, and at same time have to improve strength for vehicle crashworthiness and durability while reducing weight of vehicle to improve fuel efficiency.

Therefore, intense research and development endeavors have been undertaken to reduce the amount of material utilized in car by increasing the strength of material. Conversely, an increase in strength of steel sheets decreases formability, and thus development of materials having both high strength and high formability is necessitated.

Earlier research and developments in the field of high strength and high formability steel sheets have resulted in several methods for producing high strength and high formability steel sheets, some of which are enumerated herein for conclusive appreciation of the present invention:

U.S. Pat. No. 9,074,272 describes steels that have the chemical composition: 0.1-0.28% C, 1.0-2.0% Si, 1.0-3.0% Mn and the remainder consisting of iron and the inevitable impurities. The microstructure includes residual austenite between 5 to 20%, bainitic ferrite 40 to 65%, polygonal ferrite 30 to 50% and less than 5% martensite. U.S. Pat. No. 9,074,272 refers to a cold rolled steel sheet with excellent elongation but the invention described in it fails to achieve the strength of 900 MPa which is a mandate for reducing the weight while keeping the complex automotive part robust.

US2015/0152533 discloses a method for producing a high strength steel which contains C: 0.12-0.18%, Si: 0.05-0.2%, Mn: 1.9-2.2%, Al: 0.2-0.5%, Cr: 0.05-0.2%, Nb: 0.01-0.06%, P: ≤0.02%, S: ≤0.003%, N: ≤0.008%, Mo: B: ≤0.0007%, Ti: ≤0.01%, Ni: ≤0.1%, Cu: ≤0.1% and, as the remainder, iron and unavoidable impurities. The steel sheet produced by method described in patent application US2015/0152533 should have a microstructure that consists of 50-90% by volume ferrite, including bainitic ferrite, 5-40% by volume martensite, up to 15% by volume residual austenite and up to 10% by volume other structural constituents. Even though US2015/0152533 contains a substantial amount of martensite (i.e. up to 40%) still fail to achieve the tensile strength level of 900 MPa.

US2014/170439 provides a cold rolled steel sheet. The steel sheet has a strength greater than 1000 MPa, a uniform elongation greater than 12% and a V-bendability greater than 90°. The composition of the steel sheet includes, expressed in percent by weight, 0.15%≤C≤0.25%, 1.8%≤Mn≤3.0%, 1.2%≤Si≤2%, 0%≤Al≤0.10%, 0%≤Cr≤0.50%, 0%≤Cu≤1%, 0%≤Ni≤1%, 0%≤S≤0.005%, 0%≤P≤0.020%, Nb≤0.015%, Ti≤0.020%, V≤0.015%, Co≤1%, N≤0.008%, B≤0.001% whereby Mn+Ni+Cu≤3%. The remainder of the composition consists of iron and inevitable impurities resulting from processing. The microstructure includes, in area percentage, 5 to 20% polygonal ferrite, 10 to 15% residual austenite, 5 to 15% martensite and a balance of bainite. The bainite is in the form of laths and includes carbides between the laths. A number N of inter-lath carbides larger than 0.1 micrometers per unit of surface area is less than or equal to 50000/mm$^2$. A fabrication method and a motor vehicle are also provided. But US2014/170439 does not mention about the phosphatabilty of the steel.

SUMMARY OF THE INVENTION

The known prior art related to the manufacture of high strength and high formability steel sheets is inflicted by one or the other deficiency; hence there lies a need for a cold rolled steel sheet having strength greater than 1000 MPa and a method of manufacturing the same.

An object of the present invention is to solve these problems by making available cold-rolled steel sheets that simultaneously have:
  an ultimate tensile strength greater than or equal to 1000 MPa and preferably above 1180 MPa, or even above 1220 MPa,
  a good phosphatability with at least 96% of the surface.

The present invention provides a heat treated and cold rolled steel sheet, the steel comprising, in weight percentage,
  0.18%≤carbon≤0.24%,
  1.5%≤manganese≤2.5%,
  1.2%≤silicon≤2%,
  0.01%≤aluminum≤0.06%,
  0.2%≤chromium≤0.5%,
  phosphorus≤0.02%,
  sulfur≤0.03%,
  and optionally one or more of the following elements
  niobium≤0.06%,
  titanium≤0.08%,
  vanadium≤0.1%,
  calcium≤0.005%
  and the balance including iron and unavoidable impurities, the steel sheet having a microstructure comprising 0% to 15% of tempered martensite, 10% to 15% of residual austenite and optionally up to 30% of ferrite in area fractions, the balance being made of bainite, bainite content being at least 55% and having an internal oxide layer of 3 microns or less on both surfaces of said steel sheet.

In a preferred embodiment, the steel sheet according to the invention may have a yield strength value greater than or above 700 MPa.

Preferably, such steel can also have a good suitability for forming, in particular for rolling with good weldability and coatability.

Another alternate or additional object of the present invention is to make available a method for the manufacturing of these sheets that is compatible with conventional industrial applications while being robust towards manufacturing parameters shifts.

The present invention provides a method of manufacturing of a heat treated and cold rolled steel sheet comprising the following successive steps:
  providing the steel composition to obtain a semi-finished product,
  reheating said semi-finished product to a temperature between 1000° C. and 1280° C.;
  rolling the said semi-finished product completely in the austenitic range wherein the hot rolling finishing temperature is greater than or equal to 850° C. to obtain a hot rolled steel sheet;

cooling the sheet at a cooling rate above 30° C./s to a temperature below or equal to 500° C.; and coiling the said hot rolled sheet and keeping the temperature of coiled sheet below 570° C.;

cooling the said hot rolled sheet;

performing scale removal process on said hot rolled steel sheet;

subjecting the hot rolled steel sheet to an annealing at a temperature between 500 and 750° C. during 1 h to 96 h;

performing optional scale removal process on said hot rolled annealed steel sheet;

cold rolling the said hot rolled steel sheet with a reduction rate between 35 and 90% to obtain a cold rolled steel sheet;

then continuously annealing the said cold rolled steel sheet at a rate between 1 to 20° C./s to a soaking temperature between Ac1 and Ac3+ 50° C. during at least 100 s, the temperature and time being selected to obtain a minimum percentage of 70% austenite;

then cooling the sheet at a rate greater than 10° C./s to a temperature between Ms−20° C. and Ms+40° C., wherein Ms is the Ms temperature of the initial austenite prior cooling and then holding the cold rolled steel sheet between 350° C. and 450° C. for a time of 200 to 1000 s; then cooling the sheet down to room temperature at a cooling rate not more than 200° C./s.

The cold rolled heat treated steel sheet of the present invention may optionally be coated with zinc or zinc alloys, or with aluminum or aluminum alloys to improve its corrosion resistance.

BRIEF DESCRIPTION OF THE DRAWINGS

FIG. 1 is a micrograph illustrating the cracks formed due to internal oxides on the surface of the cold rolled steel sheet and an internal oxide layer formed thereof. To demonstrate the cracks one of the crack is marked as 10. The cold rolled steel sheet belongs to Steel Grade 7 of table 1.

FIG. 3 is a micrograph illustrating the cracks formed due to internal oxides on the surface of the cold rolled and heat treated steel sheet and an internal oxide layer formed thereof. To demonstrate the cracks one of the crack is marked as 20. The cold rolled steel sheet belongs to Steel Grade 7 of table 1.

FIG. 5 demonstrates the porosity in coverage. One of the porosity marks is highlighted as 30. FIG. 5 belong to Steel grade 7 of table 1.

DETAILED DESCRIPTION

Figure 1:
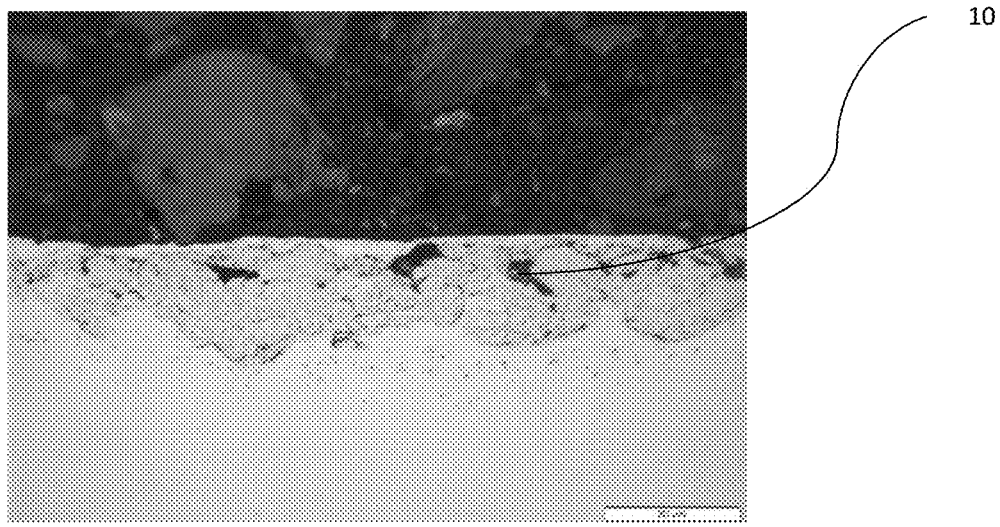
FIG. 1 is not according to the present invention.

Other characteristics and advantages of the invention will become apparent from the following detailed description of the invention.

Carbon is present in the steel between 0.18% and 0.24%. Carbon is an element necessary for increasing the strength of a steel sheet by producing a low-temperature transformation phase such as martensite. Further carbon also plays a pivotal role in austenite stabilization. A content less than 0.18% would not allow stabilizing austenite, thereby decreasing strength as well as ductility. On the other hand, at a carbon content exceeding 0.24%, a weld zone and a heat-affected zone are significantly hardened, and thus the mechanical properties of the weld zone are impaired.

Manganese content of the steel of the present invention is between 1.5% and 2.5%. Manganese is an element that imparts strength as well as stabilizes austenite to obtain residual austenite. An amount of at least about 1.5% by weight of manganese has been found in order to provide the strength and hardenability of the steel sheet as well as to stabilize austenite. Thus, a higher percentage of Manganese such as 1.9 to 2.2% is preferred. But when manganese is more than 2.5%, this produces adverse effects such as slowing down the transformation of austenite to bainite during the isothermal holding for bainite transformation, leading to a reduction of ductility. Moreover, a manganese content above 2.5% would also reduce the weldability of the present steel.

Silicon content of the steel of the present invention is between 1.2% and 2%. Silicon as a constituent retards the precipitation of carbon from austenite. Therefore due to the presence of 1.2% of silicon, carbon-rich Austenite is stabilized at room temperature. However, adding more than 2% of silicon does not improve the mentioned effect and leads to problems such as hot rolling embrittlement. Therefore, the concentration is controlled within an upper limit of 2%.

The content of aluminum of the steel of the present invention is between 0.01 and 0.06%. Within such range, aluminum bounds nitrogen in the steel to form aluminum nitride so as to reduce the size of the grains. But, whenever the content of aluminum exceeds 0.06% in the present invention, it will increase the Ac3 point, thereby lowering the productivity.

Chromium content of the steel of the present invention is between 0.2% and 0.5%. Chromium is an essential element that provide strength and hardening to the steel, but when used above 0.5% impairs surface finish of the steel.

Phosphorus content of the steel of the present invention is limited to 0.02%. Phosphorus is an element which hardens in solid solution and also interferes with formation of carbides. Therefore a small amount of phosphorus, of at least 0.002% can be advantageous, but phosphorus has its adverse effects also, such as a reduction of the spot weldability and the hot ductility, particularly due to its tendency to segregation at the grain boundaries or co-segregation with manganese. For these reasons, its content is preferably limited a maximum of 0.015%.

Sulfur is not an essential element but may be contained as an impurity in the steel. The sulfur content is preferably as low as possible, but is 0.03% or less and preferably at most 0.003%, from the viewpoint of manufacturing cost. Further if higher sulfur is present in steel it combines to form sulfide especially with Mn and Ti and reduces their beneficial impact on the present invention.

Niobium is an optional element that can be added to the steel between 0% and 0.06%, preferably between 0.0010 and 0.06%. It is suitable for forming carbonitrides to impart strength to the steel according to the invention by precipitation hardening. Because niobium delays the recrystallization during the heating, the microstructure formed at the end of the holding temperature and as a consequence after the complete annealing is finer, this leads to the hardening of the product. But, when the niobium content is above 0.06% the amount of carbo-nitrides is not favorable for the present invention as large amount of carbo-nitrides tend to reduce the ductility of the steel.

Titanium is an optional element which may be added to the steel of the present invention between 0% and 0.08%, preferably between 0.001% and 0.08%. As niobium, it is involved in carbo-nitrides so plays a role in hardening. But it is also involved to form TiN appearing during solidification of the cast product. The amount of Ti is so limited to 0.08% to avoid coarse TiN detrimental for hole expansion. In case the titanium content is below 0.001% it does not impart any effect on the steel of the present invention.

Vanadium is an optional element which may be added to the steel of the present invention between 0% and 0.1%, preferably between 0.001% and 0.01%. As niobium, it is involved in carbo-nitrides so plays a role in hardening. But it is also involved to form VN appearing during solidification of the cast product. The amount of V is so limited to 0.1% to avoid coarse VN detrimental for hole expansion. In case the vanadium content is below 0.001% it does not impart any effect on the steel of the present invention.

Calcium is an optional element which may be added to the steel of the present invention between 0% and 0.005%, preferably between 0.001% and 0.005%. Calcium is added to steel of present invention as an optional element especially during the inclusion treatment. Calcium contributes towards the refining of the steel by arresting the detrimental sulphur content in globularizing it.

Other elements such as cerium, boron, magnesium or zirconium can be added individually or in combination in the following proportions: Ce≤0.1%, B≤0.01%, Mg≤0.05% and Zr≤0.05%. Up to the maximum content levels indicated, these elements make it possible to refine the grain during solidification.

Among the alloying elements present in the steel of the present invention Silicon, Manganese, Aluminum and Chromium are more oxidizable than iron and it is well known that the mentioned elements undergo selective oxidation in addition to iron during coiling, hot band annealing, annealing and also during other similar heat treatment processes thereby forming internal-oxides.

FIG. 1 is a micrograph demonstrating the cold rolled steel sheet which is not in accordance of the present invention, the cold rolled steel sheet having a layer of internal-oxides, wherein these selective oxides are formed during coiling on the hot rolled steel sheet due to the reduced partial pressure of oxygen, these selective oxides also cause for crack generation at the grain boundaries during cold rolling on cold rolled steel sheet. In FIG. 1 crack 10 is also demonstrated on the surface of the cold rolled steel sheet. FIG. 1 also shows the internal oxides on a surface of cold rolled steel sheet having a thickness of more than 1 micron. Similarly selective oxidation also takes place during annealing.

Figure 2:
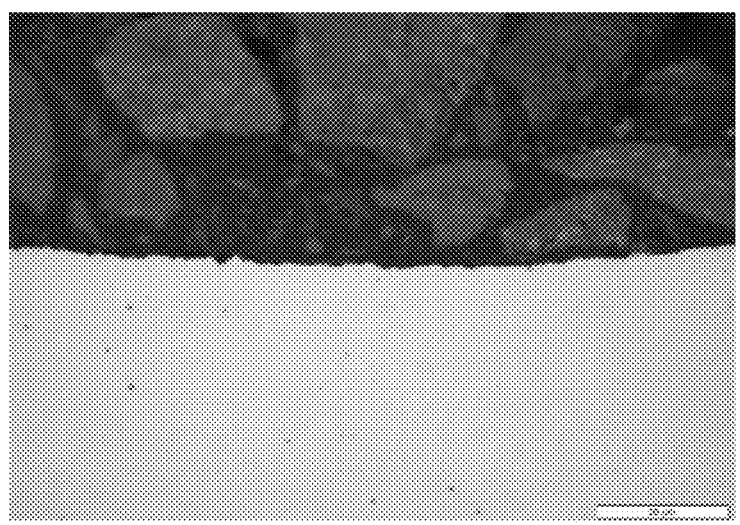
FIG. 2 is a micrograph illustrating the surface of the cold rolled steel sheet which is according to the present invention. The cold rolled steel sheet is free of the internal-oxide layer. The cold rolled steel sheet belongs to Steel Grade 2 of table 1.

FIG. 2 is a micrograph demonstrating the cold rolled steel sheet in accordance with the present invention, wherein the cold rolled steel sheet is free from the internal-oxides.

Figure 3:
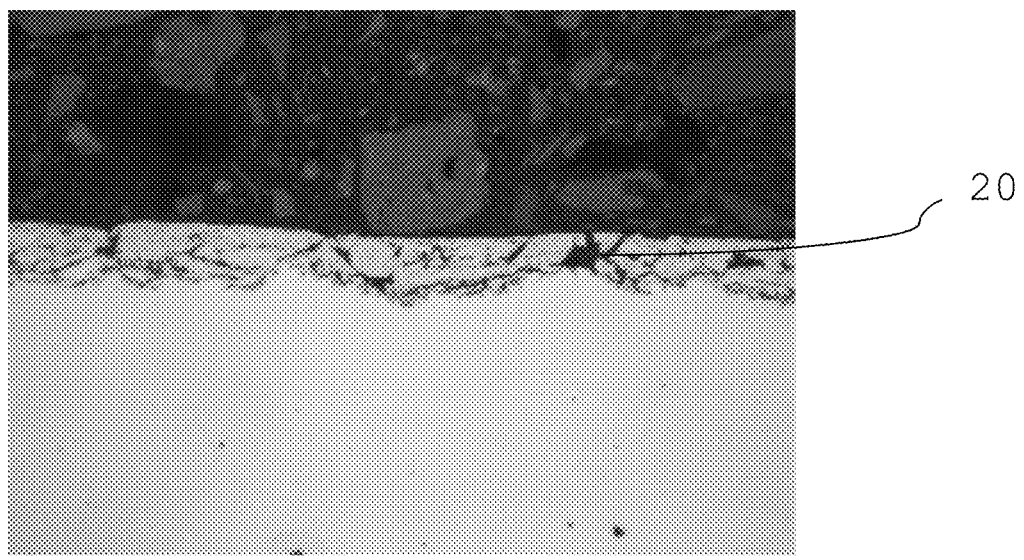
FIG. 3 is not according to the present invention.

FIG. 3 is a micrograph demonstrating the heat treated cold rolled steel sheet which is not in accordance of the present invention, the heat treated cold rolled steel sheet is having a layer of internal-oxides wherein these selective oxides are formed during coiling on the hot rolled steel sheet or during the hot band annealing on the hot rolled steel sheet or annealing on the cold rolled steel sheet due to the reduced partial pressure of oxygen, these selective oxides also cause for crack generation at the grain boundaries during cold rolling on cold rolled steel sheet which get aggravated during annealing. In FIG. 3 crack 20 is also demonstrated on the surface of the heat treated cold rolled steel sheet. FIG. 3 also shows the internal oxides on a surface of cold rolled steel sheet of thickness more than 3 microns.

Figure 4:
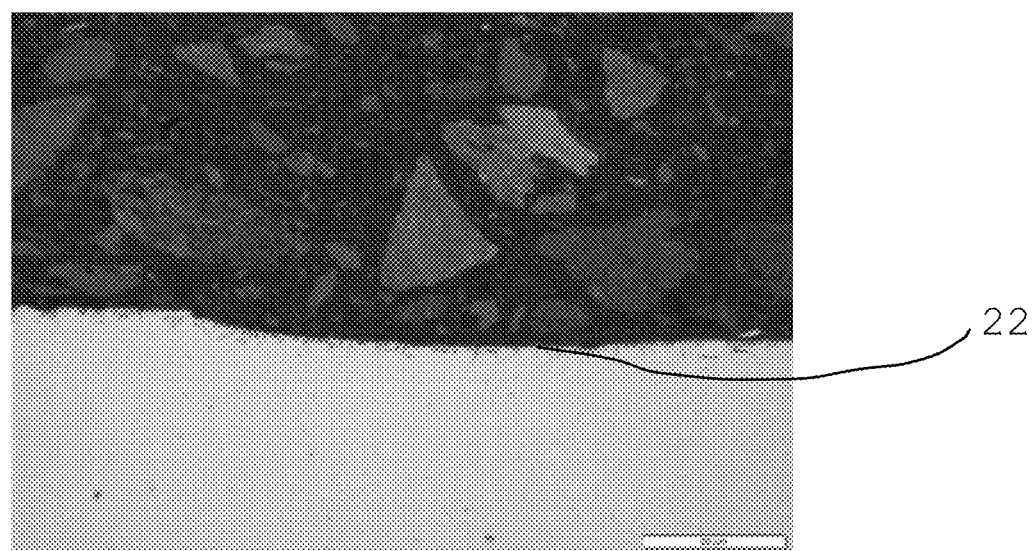
FIG. 4 is a micrograph illustrating the surface of the cold rolled and heat treated steel sheet which is according to the present invention. The cold rolled steel sheet has an internal-oxide layer of less than 3 microns. The cold rolled steel sheet belongs to Steel Grade 2 of table 1.

FIG. 4 is a micrograph demonstrating the heat treated cold rolled steel sheet in accordance of the present invention, wherein the heat treated cold rolled steel sheet still has a layer 22 of the internal-oxides but in accordance of the present invention this layer 22 is less than 3 microns thick, a thickness of up to 3 microns oxide layer being acceptable on the heat treated cold rolled sheet.

Hence the present invention envisages putting in place specific process parameters such as keeping the coiling temperature below 500° C. and performing at least one mandatory pickling before cold rolling to control the formation of internal-oxides. The present invention keeps the internal-oxide layer thin, with up to 3 microns on the final cold rolled and heat treated steel sheet being acceptable. In a preferred embodiment, such layer is made of iron, silicon, manganese and chromium.

In another embodiment, the presence of a layer of internal oxides of a thickness of 1 micron or less on the cold rolled sheet after cold rolling is preferred.

The remainder of the composition of the steel consists of iron and inevitable impurities resulting from processing.

The microstructure of the steel sheet according to the invention comprises 0% to 15% of tempered martensite, 10% to 15% of residual austenite and optionally up to 30% of ferrite in area fractions, the balance being made of bainite, bainite content being at least 55%.

Bainite is the matrix of the steel and is contained in a minimum of 55%, preferably of 60%. In the frame of the present invention, bainite consists of lath bainite and granular bainite. Granular bainite is a bainite having a very low density of carbides, meaning that the steel includes less than 100 carbides per area unit of 100 µm². Lath bainite is in the form of thin ferrite laths with carbide formed between the laths. The size of carbides present between the laths is such that the number of carbides bigger than 0.1 micron is below 50,000/mm². The lath bainite provides the steel with adequate hole expansion whereas the granular bainite provides an improved elongation.

Tempered martensite is contained in an amount of 0 to 15%. It is preferred to have the content of tempered martensite to achieve the strength level of 1000 MPa or more and if the martensite amount reaches beyond 15%, it would have detrimental impact on ductility.

Residual Austenite is contained in an amount of 10 to 15%. It is known to have a higher solubility of carbon than bainite and hence acts as effective carbon trap, therefore retarding the formation of carbides in bainite. The residual austenite of the present invention preferably contains carbon between 0.9 and 1.15%, with an average content of carbon in austenite of 1.00%. Austenite also imparts ductility to the present steel.

Martensite and austenite can be present in the steel according to the invention, as isolated phases or under the form of martensite-austenite islands, which is preferred.

Ferrite may be present between 0% and 30% in the steel. Such ferrite may comprise polygonal ferrite, lath ferrite, acicular ferrite, plate ferrite or epitaxial ferrite. The presence of ferrite in the present invention may impart the steel with formability and elongation. Presence of ferrite has negative impacts due to the fact that ferrite increases the gap in hardness with hard phases such as martensite and bainite and reduces local ductility. If ferrite presence is above 30% the targeted tensile strength is not achieved.

A steel sheet according to the invention can be produced by any suitable method. A preferred method consists in providing a semi-finished casting of steel with a chemical composition according to the invention. The casting can be done either into ingots or continuously in form of thin slabs or thin strips, i.e. with a thickness ranging from approximately 220 mm for slabs up to several tens of millimeters for thin strip.

For example, a slab will be considered as a semi-finished product. A slab having the above-described chemical composition is manufactured by continuous casting wherein the slab preferably underwent a direct soft reduction during casting to ensure the elimination of central segregation and porosity reduction. The slab provided by continuous casting process can be used directly at a high temperature after the continuous casting or may be first cooled to room temperature and then reheated for hot rolling.

The temperature of the slab which is subjected to hot rolling is preferably at least 1000° C., preferably above 1200° C. and must be below 1280° C. In case the temperature of the slab is lower than 1000° C., excessive load is imposed on a rolling mill, and further, the temperature of the steel may decrease to a ferrite transformation temperature during finishing rolling, whereby the steel will be rolled in a state in which transformed ferrite contained in the structure. Further, the temperature must not be above 1280° C. as there would be a risk of formation of rough ferrite grains resulting in coarse ferrite grain which decreases the capacity of these grains to re-crystallize during hot rolling. The larger the initial ferrite grain size, the less easily it re-crystallizes, which means that reheat temperatures above 1280° C. must be avoided because they are industrially expensive and unfavorable in terms of the recrystallization of ferrite.

The temperature of the slab is preferably sufficiently high so that hot rolling can be completed entirely in the austenitic range, the finishing hot rolling temperature remaining above 850° C. and preferably above 900° C. It is necessary that the final rolling be performed above 850° C., because below this temperature the steel sheet exhibits a significant drop in rollability. A final rolling temperature between 900 and 950° C. is preferred to have a structure that is favorable to recrystallization and rolling.

The sheet obtained in this manner is then cooled at a cooling rate above 30° C./s to a temperature which is below 500° C. The cooling temperature is kept below 500° C. to avoid selective oxidation of alloying elements such as manganese, silicon and chromium. Preferably, the cooling rate will be less than or equal to 65° C./s and above 35° C./s. Thereafter the hot rolled steel sheet is coiled and during the time which hot rolled sheet remains coiled the transformation of austenite into bainite takes place and the temperature of the coiled hot rolled sheet rises due to recalescence. The temperature of the coiled hot rolled steel sheet must be kept below 570° C. to avoid selective internal oxidation of Silicon, Manganese, Aluminum and Chromium on the surface of hot rolled coil as these oxides forms cracks on the surface of the hot rolled steel sheet. Thereafter the coiled hot rolled steel sheet is allowed to cool down to room temperature. Then the hot rolled sheet is subjected to a scale removal process such as pickling to remove scale formed during hot rolling and ensure that there is no scale on the surface of hot rolled steel sheet before subjecting it to hot band annealing.

The hot rolled sheet is then subjected to hot band annealing at a temperature between 350° C. and 750° C. during 1 to 96 hours. The temperature and time of such hot band annealing is selected to ensure softening of the hot rolled sheet to facilitate the cold rolling of the hot rolled steel sheet. Further the atmosphere of the Hot band annealing is controlled to avoid oxidation during hot band annealing. The scale removal process before hot band annealing is not mandatory, if hot band annealing is done between temperature range 350° C. and 500° C. during 1 to 96 hours as in this temperature range there is very less possibility of increasing the thickness of oxide layer. However, if the hot band annealing is performed between 500 and 750° C., the scale removal process to be done before such annealing is mandatory.

The Hot rolled steel sheet is then cooled down to room temperature to obtain the annealed hot rolled sheet. Thereafter, the annealed hot rolled sheet may be subjected to an optional scale removal process. In accordance with the present invention, at least one scale removal process must be performed before cold rolling.

The annealed hot rolled sheet is then cold rolled with a thickness reduction between 35 to 70% to obtain a cold rolled steel sheet. The obtained cold rolled steel sheet is substantially free from internal-oxides.

FIG. 2 is a micrograph demonstrating the cold rolled steel sheet in accordance of the present invention, wherein the cold rolled steel sheet is free from the internal oxides but according to the present invention a layer of oxides up to a thickness of 1 micron on the cold rolled sheet after pickling and HBA is acceptable.

The cold rolled steel sheet is then subjected to annealing to impart the steel of present invention with targeted microstructure and mechanical properties.

To continuously anneal the cold rolled steel sheet, it is first heated at a heating rate between 1 and 20° C./s, preferably greater than 3° C./s, to a soaking temperature between Ac1 and Ac3+ 50° C. during at least 100 s and preferably not more than 1000 s to ensure an adequate re-crystallization and transformation to obtain a minimum of 70% Austenite microstructure. Ac1 for the steel according to the invention is usually between 680 and 750° C. Ac3 for the steel according to the invention is usually between 820 and 900° C.

The sheet is then cooled at a cooling rate of more than 10° C./s between a cooling temperature range between Ms−20° C. and Ms+40° C. wherein Ms is calculated according to the following formula:

$$Ms=565-(31*[Mn]+13*[Si]+10*[Cr]+18*[Ni]+12*[Mo])-600*(1-EXP(-0.96*[C]))$$

In a preferred embodiment, the cooling rate is greater than 30° C./s.

Then the temperature of cold rolled steel sheet is brought to a temperature range between Ms+10 and Ms+100° C. which is generally between 350° C. and 450° C. and held there for a time of at least 200 s but not more than 1000 s. This isothermal overaging stabilizes the carbon rich austenite and contributes to the formation and stabilization of low density carbide bainite, conferring the steel of present invention with targeted mechanical properties.

The cold rolled steel sheet is then cooled to room temperature at a cooling rate not more than 200° C./s. During this cooling unstable residual austenite may transform to fresh martensite in form of MA islands.

An optional skin pass or leveler operation with a reduction rate below 0.8% may be performed at that stage.

FIG. 4 is a micrograph showing the heat treated cold rolled steel sheet in accordance of the present invention the sheet belong to the Steel Sample 2, wherein the heat treated cold rolled steel sheet has a layer 22 of the internal oxides of less than 3 microns which is in accordance of the present invention.

The heat treated cold rolled sheet may then be optionally coated by electro-deposition or vacuum coating or any other suitable process.

A post batch annealing, preferably done at 170 to 210° C. during 12 h to 30 h can be done optionally after annealing on uncoated product or after coating on coated product in order to reduce hardness gradient between phases and ensure degasing for coated products.

EXAMPLES

The following tests and examples presented herein are non-restricting in nature and must be considered for purposes of illustration only, and will display the advantageous features of the present invention and expound the significance of the parameters chosen by inventors after extensive experiments and further establish the properties that can be achieved by the steel according to the invention.

Samples of the steel sheets according to the invention and to some comparative grades were prepared with the compositions gathered in table 1 and the processing parameters gathered in table 2. The corresponding microstructures of those steel sheets were gathered in table 3 and the properties in table 4.

Table 1 depicts the steels with the compositions expressed in percentages by weight.

TABLE 1 composition of the trials

| Steel Grade | C | Mn | Si | Al | Cr | P | S | N | Nb | Ti | V | Ca |
|---|---|---|---|---|---|---|---|---|---|---|---|---|
| 1 | 0.212 | 2.09 | 1.512 | 0.042 | 0.352 | 0.011 | 0.002 | 0.007 | 0.001 | 0.005 | — | — |
| 2 | 0.213 | 2.08 | 1.490 | 0.034 | 0.357 | 0.01 | 0.001 | 0.004 | 0.002 | 0.005 | 0.002 | 0.001 |
| 3 | 0.211 | 2.11 | 1.473 | 0.042 | 0.368 | 0.012 | 0.003 | 0.004 | 0.001 | 0.004 | 0.002 | — |
| 4 | 0.197 | 2.215 | 1.472 | 0.043 | 0.200 | 0.0126 | 0.0004 | 0.005 | 0.002 | 0.01 | 0.004 | — |
| 5 | 0.212 | 2.09 | 1.514 | 0.042 | 0.352 | 0.011 | 0.002 | 0.007 | 0.001 | 0.005 | 0.002 | — |
| 6 | 0.212 | 2.09 | 1.492 | 0.042 | 0.355 | 0.011 | 0.002 | 0.007 | 0.001 | 0.004 | 0.002 | — |
| 7 | 0.211 | 2.08 | 1.480 | 0.041 | 0.351 | 0.011 | 0.002 | 0.007 | 0.001 | 0.004 | 0.002 | — |
| 8 | 0.212 | 2.094 | 1.490 | 0.042 | 0.354 | 0.01 | 0.002 | 0.007 | 0.001 | 0.004 | 0.002 | — |
| 9 | 0.202 | 2.211 | 1.503 | 0.056 | 0.198 | 0.013 | 0.0022 | 0.0038 | 0.0007 | 0.006 | 0.0007 | — |
| 10 | 0.212 | 2.092 | 1.535 | 0.042 | 0.352 | 0.011 | 0.002 | 0.007 | 0.008 | 0.004 | 0.002 | — |

Table 2 gathers the annealing process parameters implemented on steels of Table 1.

Table 1 also shows Bainite transformation Bs and Martensite transformation Ms temperatures of inventive steel and reference steel. The calculation of Bs and Ms is done by using Van Bohemen formula published in Materials Science and Technology (2012) vol 28, no 4, pp 487-495, which is as follows:

$$Bs = 839 - (86*[Mn] + 23*[Si] + 67*[Cr] + 33*[Ni] + 75*[Mo]) - 270*(1 - EXP(-1,33*[C]))$$

$$Ms = 565 - (31*[Mn] + 13*[Si] + 10*[Cr] + 18*[Ni] + 12*[Mo]) - 600*(1 - EXP(-0,961*[C]))$$

Further, before performing the annealing treatment on the steels of invention as well as reference, the samples were heated to a temperature between 1000° C. and 1280° C. and then subjected to hot rolling with finish temperature above 850° C.

TABLE 2 process parameters of the trials

| Trials | Steel Grade | Cooling T (° C.) | Pickling | HBA T (° C.) | HBA t (h) | Pickling | CR | Annealing Heating rate (° C./s) | Annealing Soaking T (° C.) | Annealing Soaking t (s) | T stop (° C.) | Holding Cooling rate (° C./s) | Holding Cycle T (° C.) | Holding Cycle t (s) | BS (° C.) | Ms (° C.) |
|---|---|---|---|---|---|---|---|---|---|---|---|---|---|---|---|---|
| I1 | 1 | 450 | Yes | 620 | 12 h | Yes | 0.52 | 2.5 | 868 | 155 | 358 | 39 | 411 | 366 | 535 | 367 |
| I2 | 2 | 450 | Yes | 650 | 12 h | Yes | 0.50 | 2.6 | 851 | 155 | 360 | 39 | 405 | 366 | 535 | 367 |
| I3 | 3 | 450 | Yes | 680 | 12 h | No | 0.46 | 2.3 | 866 | 155 | 351 | 31 | 406 | 366 | 533 | 367 |
| I4 | 4 | 450 | Yes | 620 | 14 h | Yes | 0.57 | 19 | 825 | 222 | 405 | 15 | 405 | 470 | 539 | 372 |

TABLE 2-continued process parameters of the trials

| | | Cooling | | HBA | | | | Annealing | | | | Holding | | | | |
| | | | | | | | | Heating | Soaking | Soaking | | Cooling | Cycle | | | |
| Trials | Steel Grade | T (° C.) | Pickling | T (° C.) | t (h) | Pickling | CR | rate (° C./s) | T (° C.) | t (s) | T stop (° C.) | rate (° C./s) | T (° C.) | t (s) | BS (° C.) | Ms (° C.) |
|---|---|---|---|---|---|---|---|---|---|---|---|---|---|---|---|---|
| I5 | 5 | 450 | No | 450 | 24 h | Yes | 0.64 | 2.5 | 871 | 155 | 362 | 39 | 416 | 366 | 535 | 367 |
| R1 | 6 | 550 | Yes | 680 | 12 h | Yes | 0.56 | 2.6 | 867 | 155 | 363 | 39 | 409 | 366 | 535 | 367 |
| R2 | 7 | 551 | No | 680 | 12 h | Yes | 0.56 | 2.6 | 867 | 155 | 362 | 39 | 409 | 366 | 536 | 368 |
| R3 | 8 | 450 | No | 600 | 12 h | Yes | 0.55 | 2.5 | 866 | 155 | 357 | 34 | 404 | 366 | 535 | 367 |
| R4 | 9 | 550 | No | 550 | 12 h | Yes | 0.56 | 19 | 830 | 222 | 405 | 15 | 405 | 470 | 537 | 369 |
| R5 | 10 | 450 | No | 560 | 12 h | Yes | 0.56 | 2.5 | 872 | 155 | 361 | 39 | 402 | 366 | 534 | 366 |

I = according to the invention; R = reference; underlined values: not according to the invention.
underlined values: not according to the invention.
HBA: hot band annealing of steel sheet Table 3 gathers the results of test conducted in accordance of standards on different microscopes such as Scanning Electron Microscope for determining microstructural composition of both the inventive steel and reference trials.

TABLE 3 microstructures of the trials

| Trials | Bainite | Tempered Martensite | residual austenite | % C in austenite | Ferrite |
|---|---|---|---|---|---|
| I1 | 75 | 12 | 13 | 1.10 | 0 |
| I2 | 77 | 11 | 12 | 1.12 | 0 |
| I3 | 76 | 12 | 12 | 1.12 | 0 |
| I4 | 64 | 3 | 11 | 1.10 | 22 |
| I5 | 74 | 15 | 11 | 1.11 | 0 |
| R1 | 77 | 12 | 11 | 1.11 | 0 |
| R2 | 76 | 12 | 12 | 1.12 | 0 |
| R3 | 74 | 14 | 12 | 1.1 | 0 |
| R4 | 61 | 5 | 12 | 1.11 | 22 |
| R5 | 74 | 15 | 11 | 1.10 | 0 |

Table 4 gathers the mechanical and surface properties of both the inventive steel and reference steel. The tensile strength and yield strength are conducted in accordance with JIS Z2241 standards.

TABLE 4 mechanical and surface properties of the trials

| Trials | Tensile strength (MPa) | Yield strength (MPa) | Phosphatation coverage (%) | Internal oxidation on cold rolled steel sheet (μm) | Internal oxidation on cold rolled and heat treated steel sheet (μm) |
|---|---|---|---|---|---|
| I1 | 1242 | 959 | 100 | 0 | 1.9 |
| I2 | 1227 | 976 | 100 | 0 | 1.9 |
| I3 | 1183 | 857 | 100 | 0 | 1.8 |
| I4 | 1094 | 726 | 100 | 0 | 2.6 |
| I5 | 1275 | 980 | 100 | 0 | 2.2 |
| R1 | 1212 | 858 | 0 | 14 | 4.5 |
| R2 | 1216 | 896 | 90 | 21.2 | 8.5 |
| R3 | 1241 | 924 | 94 | 15.1 | 6.8 |
| R4 | 1121 | 748 | 93 | 13 | 6.5 |
| R5 | 1269 | 1002 | 94 | 12 | 7.1 |

I = according to the invention; R = reference; underlined values: not according to the invention.

Figure 5:
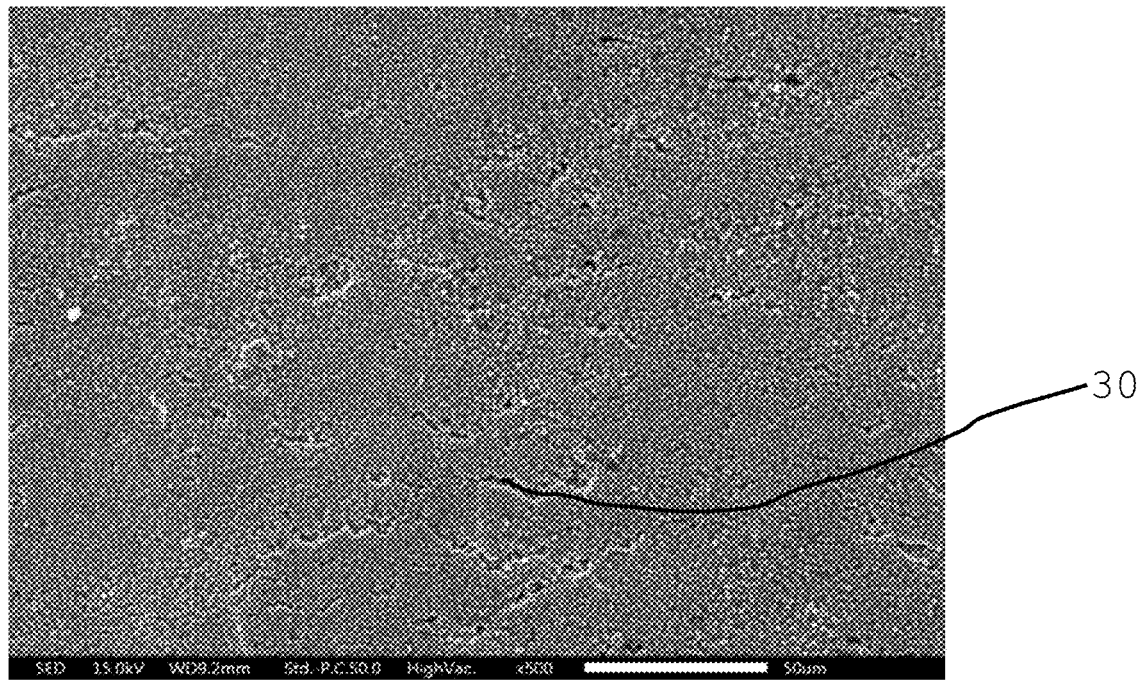
FIG. 5 is a micrograph demonstrating the phosphatation on a cold rolled and heat treated steel sheet not according to the invention.
Figure 6:
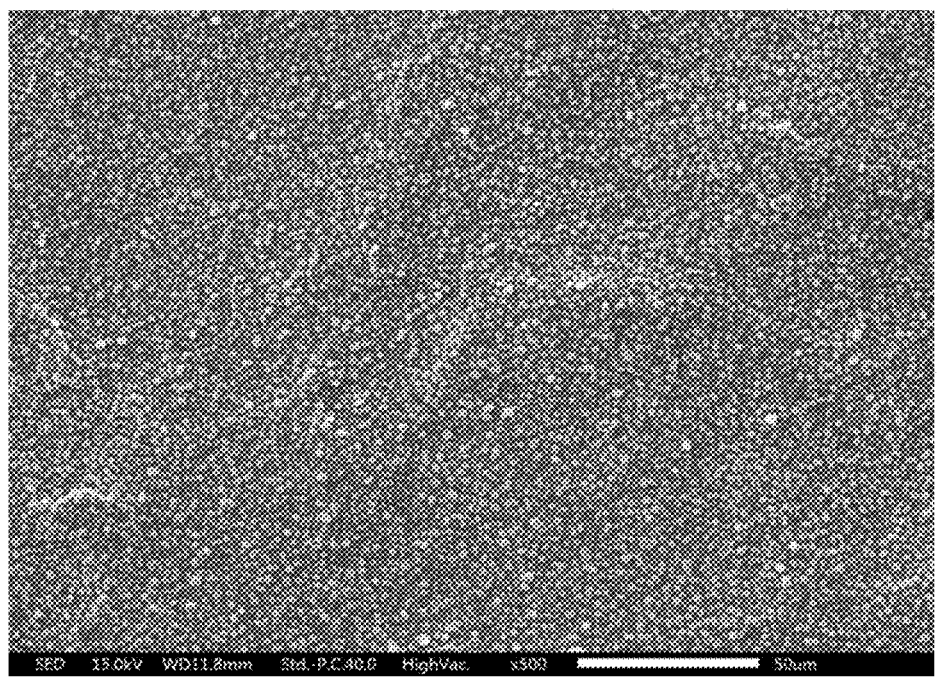
FIG. 6 is a micrograph demonstrating the phosphatation on a cold rolled and heat treated steel sheet according to the invention. The demonstrated steel sheet belongs to Steel Grade 2 of table 1 with 100% phosphatation coverage.

The examples show that the steel sheets according to the invention are the only ones to show all the targeted properties thanks to their specific composition and microstructures and method of manufacture. For example, FIG. 5 shows a micrograph demonstrating the phosphatation on a cold rolled and heat treated steel sheet not according to the invention. FIG. 5 demonstrates the porosity in coverage. One of the porosity marks is highlighted as 30. FIG. 5 belong to Steel grade 7 of table 1. FIG. 6 is a micrograph demonstrating the phosphatation on a cold rolled and heat treated steel sheet according to the invention. The demonstrated steel sheet belongs to Steel Grade 2 of table 1 with 100% phosphatation coverage.

What is claimed is:

1. A heat treated and cold rolled steel sheet, having a steel composition comprising, in weight percentage:
   0.18%<carbon<0.24%,
   1.5%<manganese<2.5%,
   1.2%<silicon<2%,
   0.01%<aluminum<0.06%,
   0.2%<chromium<0.5%,
   phosphorus<0.02%,
   sulfur<0.03%,
   and optionally one or more of the following elements
   niobium<0.06%,
   titanium<0.08%,
   vanadium<0.1%,
   calcium<0.005%
   a balance including iron and unavoidable impurities,
   the heat treated and cold rolled steel sheet having a microstructure comprising 0% to 15% of tempered martensite, 10% to 15% of residual austenite and optionally up to 30% of ferrite in area fractions, a microstructure balance being made of bainite, the bainite content being at least 55% and being free of or having an internal oxide layer of 3 microns thickness or less on both surfaces of said steel sheet, the bainite consisting of granular bainite and lath bainite.

2. The heat treated and cold rolled steel sheet as recited in claim 1 wherein the composition includes 2.0% to 2.3% of manganese.

3. The heat treated and cold rolled steel sheet as recited in claim 1 wherein the composition includes a maximum of 0.013% of phosphorus.

4. The heat treated and cold rolled steel sheet as recited in claim 1 wherein the microstructure contains more than 60% of the bainite.

5. The heat treated and cold rolled steel sheet as recited in claim 1 wherein the residual austenite has a carbon concentration between 0.9 and 1.15%.

6. The heat treated and cold rolled steel sheet as recited in claim 1 wherein the heat treated and cold rolled steel sheet has a tensile strength greater than or equal to 1000 MPa, and a phosphatation coverage of 96% or more.

7. The heat treated and cold rolled steel sheet as recited in claim 1 wherein the heat treated and cold rolled steel sheet has a tensile strength greater than or equal to 1050 MPa, and a phosphatation coverage of 98% or more.

8. The heat treated and cold rolled steel sheet as recited in claim 1 wherein the heat treated and cold rolled steel sheet is free of or has the internal oxide layer, the thickness being 2 microns or less on both surfaces.

9. The heat treated and cold rolled steel sheet as recited in claim 8 wherein if the internal oxide layer is present, the thickness is 1 micron or less on both surfaces.

10. The heat treated and cold rolled steel sheet of claim 1, wherein the bainite content is from 64% to 77%, in area fraction.

11. A method of manufacturing of the heat treated and cold rolled steel sheet according to claim 1 comprising the following successive steps: providing a steel composition in weight percentage:
0.18%<carbon<0.24%,
1.5%<manganese<2.5%,
1.2%<silicon<2%,
0.01%<aluminum<0.06%,
0.2%<chromium<0.5%,
phosphorus<0.02%,
sulfur<0.03%,
and optionally one or more of the following elements
niobium<0.06%,
titanium<0.08%,
vanadium<0.1%,
calcium<0.005%
a balance including iron and unavoidable impurities to obtain a semi-finished product;
reheating the semi-finished product to a temperature between 1000° C. and 1280° C.;
rolling the said semi-finished product completely in the austenitic range wherein the hot rolling finishing temperature is greater than or equal to 850° C. to obtain a hot rolled steel sheet;
cooling the hot rolled steel sheet at a cooling rate above 30° C./s to a temperature below or equal to 500° C. and coiling the hot rolled sheet and keeping the temperature of coiled sheet below 570° C.;
cooling the hot rolled steel sheet;
performing a scale removal process on the hot rolled steel sheet;
subjecting the hot rolled steel sheet to an annealing at a temperature between 500 and 750° C. during 1 h to 96 h to define a hot rolled annealed steel sheet;
performing an optional scale removal process on the hot rolled annealed steel sheet;
cold rolling the hot rolled annealed steel sheet with a reduction rate between 35 and 90% to obtain a cold rolled steel sheet;
continuously annealing the cold rolled steel sheet at a rate between 1 to 20° C./s to a soaking temperature between Ac1 and Ac3+ 50° C. for at least 100 s, the temperature and time being selected to obtain a minimum percentage of 70% austenite;
cooling the sheet at a rate greater than 10° C./s to a temperature between Ms−20° C. and Ms+40° C., wherein Ms is the Ms temperature of the initial austenite prior cooling and holding the cold rolled steel sheet between 350° C. and 450° C. for a time of 200 to 1000 s; and
cooling the sheet down to room temperature at a cooling rate not more than 200° C./s;
thereby producing the heat treated and cold rolled steel sheet according to claim 1.

12. The method as recited in claim 11 wherein the cooling temperature for the cooling of the hot rolled steel sheet is set between 150° C. and 500° C.

13. The method as recited in claim 11 wherein the continuous annealing is performed between 800° C. and 900° C. between 100s and 1000s.

14. The method as recited in claim 11 further comprising coating the cold rolled steel sheet with zinc or a zinc based alloy.

15. A method of manufacturing of the heat treated and cold rolled steel sheet according to claim 1 comprising the following successive steps: providing a steel composition in weight percentage:
0.18%<carbon<0.24%,
1.5%<manganese<2.5%,
1.2%<silicon<2%,
0.01%<aluminum<0.06%,
0.2%<chromium<0.5%,
phosphorus<0.02%,
sulfur<0.03%,
and optionally one or more of the following elements
niobium<0.06%,
titanium<0.08%,
vanadium<0.1%,
calcium<0.005%
a balance including iron and unavoidable impurities to obtain a semi-finished product;
reheating the semi-finished product to a temperature between 1000° C. and 1280° C.;
rolling the semi-finished product completely in the austenitic range wherein the hot rolling finishing temperature is greater than or equal to 850° C. to obtain a hot rolled steel sheet;
cooling the hot rolled steel sheet at a cooling rate above 30° C./s to a cooling temperature below or equal to 500° C. and coiling the hot rolled sheet and keeping the temperature of coiled sheet below 570° C.;
cooling the hot rolled steel sheet;
subjecting the hot rolled steel sheet to an annealing at a temperature between 350° C. and 500° C. during 1 h to 96 h;
performing at least one scale removal process on the hot rolled steel sheet before or after the annealing;
cold rolling the hot rolled steel sheet with a reduction rate between 35 and 90% to obtain a cold rolled steel sheet;
continuously annealing the cold rolled steel sheet at a rate between 1 to 20° C./s to a soaking temperature between Ac1 and Ac3+ 50° C. for at least 100 s, the temperature and time being selected to obtain a minimum percentage of 70% austenite;
cooling the sheet at a rate greater than 10° C./s to a temperature between Ms−20° C. and Ms+40° C., wherein Ms is the Ms temperature of the initial austenite prior cooling and holding the cold rolled steel sheet between 350 and 450° C. for a time of 200 to 1000 s; and
cooling the sheet down to room temperature at a cooling rate not more than 200° C./s;
thereby producing the heat treated and cold rolled steel sheet according to claim 1.

16. The method as recited in claim 15 wherein the cooling temperature for the cooling of the hot rolled steel sheet is set between 150° C. and 500° C.

17. The method as recited in claim 15 wherein the continuous annealing is performed between 800° C. and 900° C. between 100s and 1000s.

18. The method as recited in claim 15 further comprising coating the cold rolled steel sheet with zinc or a zinc based alloy.

19. A structural or safety part of a vehicle made according to the method as recited in claim 11.

20. A vehicle comprising the part as recited in claim 19.

21. A structural or safety part of a vehicle made according to the method as recited in claim 15.

22. A vehicle comprising the part as recited in claim 21.

23. A structural or safety part of a vehicle comprising heat treated and cold rolled steel sheet as recited in claim 1.

24. A vehicle comprising the part as recited in claim 23.

* * * * *